INCREMENTAL MAGNETIC TAPE RECORDING SYSTEM

Filed July 3, 1963 2 Sheets-Sheet 1

INVENTOR
JOHN PAUL JONES, JR.

BY Watson, Cole, Grindle & Watson

ATTORNEYS

INCREMENTAL MAGNETIC TAPE RECORDING SYSTEM

Filed July 3, 1963 2 Sheets-Sheet 2

INVENTOR
JOHN PAUL JONES, JR.
BY Watson, Cole, Grindle & Watson
ATTORNEYS

United States Patent Office 3,319,237
Patented May 9, 1967

3,319,237

INCREMENTAL MAGNETIC TAPE RECORDING SYSTEM

John Paul Jones, Jr., Wynnewood, Pa., assignor to Navigation Computer Corporation, Norristown, Pa., a corporation of Pennsylvania Filed July 3, 1963, Ser. No. 292,595
9 Claims. (Cl. 340—174.1)

This invention relates to magnetic recording systems and more specifically, relates to systems of magnetic recording wherein the tape is advanced on an incremental basis step by step between each of the bits of magnetic information recorded upon the tape.

A considerable number of problems are encountered when attempting to produce an acceptable incremental magnetic recording system. For example, many static recording techniques have been developed for writing upon a magnetic tape when it is stopped in a static position, however, none of these static recording systems have been satisfactory as compared with dynamic recording techniques usually used in connection with computer systems and conventional magnetic recording systems.

Furthermore, it is a serious requirement of incremental magnetic recording systems to provide exact registration or sprocketing so that each incremental bit may be recalled either on a step-by-step basis or upon a basis which will satisfactorily match the requirements of the system into which the magnetic information will be read. Thus, the requirement for a system which may operate asynchronously with input and output data is certainly evident. Furthermore, it is clear that it is not desirable in a system of this type to require adjustments or compensating devices for each individual record to make sure that it is properly oriented with respect to the incremental recording positions. As a matter of fact, in many of the prior art systems, not only is indexing difficult, but in addition, accumulative errors may be introduced which seriously limit the packing density at which satisfactory recording can be accomplished. The economy in use of magnetic tape and the ability to use high packing density in the storage of incremental data is a requirement of an acceptable magnetic recording system.

It is also to be recognized that inherently a step-by-step incremental magnetic recording system is extremely advantageous if it meets all of the requirements of an acceptable system, because much of the data required in modern computer technology is provided manually at a slow asynchronous input rate. Becuse of the inherent limitations of magnetic recording systems most of such data is handled conventionally by use of punch paper tape devices. Such devices, however, have the serious limitation that the cost of paper tape, which is expendable, becomes significant when handling large volumes of data, and the tape takes up such an amount of space that it becomes very cumbersome and inconvenient when used for example in digital computer systems. The amount of information that may be stored upon a roll of punch paper tape becomes rather insignificant in some applications and the mere requirement of having to exchange paper tape reels restricts the usefulness of such devices.

A still further problem in connection with magnetic recorder systems in general is the complexity and expense. This not only limits the application of such devices as a matter of economics, but the complexity in many instances causes difficulty in maintenance. This is a serious problem since most of such devices must be used at various locations where expert technicians are not available to make repairs. Thus, simplicity and ease of maintenance is a prime requirement of such devices.

Many maintenance problems are introduced, for example, because of the failure of parts caused when transistors are subjected to high temperatures. Other problems are introduced when devices such as electric motors are used continuously since in most cases they require brushes or commutators, which have a limited life, measured in terms of a few hundred hours of operation. Accordingly, it is essential in reliable digital recording equipment to reduce hot spots and to provide for operation of motors over long periods of equipment life.

Accordingly, it is a general object of the invention to provide an improved incremental magnetic tape recording system.

Another object of the invention is to provide an incremental magnetic recording system which may be used with dynamic magnetic recording techniques.

A further object of the invention is to provide an incremental magnetic recording system which may be operated essentially asynchronously with input and output data systems and which may be operated at high speeds.

A still further object of the invention is to provide an incremental magnetic recording system in which very good packing density between recorded magnetic bits is provided without introducing accumulative errors or indexing problems.

It is another object of the invention to provide a magnetic recording system which is very simple in construction and inexpensive to produce having a minimum of wearing parts and thereby causing little maintenance difficulty.

A still further object of the invention is to provide an improved driving arrangement for advancing the magnetic tape.

Therefore, in accordance with the present invention, a simplified incremental tape recording system is provided with a minimum of moving and wearing parts. Thus, the tape is advanced by means of a multiple pole stepping motor which provides step-by-step motion to the magnetic tape. This stepping motor coupled with two intermittently operated tape advancing motors and a pair of pivoted tension arms, which sense the amount of slack in the tape on either side of the stepping motor drive means, constitute the movable and wearable parts of the system. The tape is passed over a sprocketed drum affixed to the stepping motor drive means so that the magnetic tape is physically referenced to the stepping motor by means of sprocket holes in the tape. The stepping motor thereby provides incremental advances between each of the sprocket positions.

It has been found in connection with the present invention that stepping motors of the type used in the incremental advancing vary in the length of steps between one pole and another and therefore, must be referenced to the exact pole on the motor in order to achieve desirable results in high density magnetic recording. Thus, the stepping motor is designed to have an even number of incremental steps between each of the sprocket positions on the tape. In this manner, the accuray is determined from sprocket to sprocket and does not become accumulative. It has also been found that these stepping motors have a predictable velocity curve which is encountered in moving from pole to pole. This feature is used in accordance with the invention in order to provide a dynamic recording technique with the invention. Thus, the stepping motor may be driven with an energy pulse long enough to cause it to attain maximum velocity between one pole position and the next and thereafter it will be decelerated to a stop at the succeeding pole position. Such an energy pulse derived from a system clock signal thereby may permit the entire system to be synchronized about the stepping of the motor. Thus, the expiration of the clock pulse will occur at such time that the motor and the tape driven thereby are at maximum or peak velocity and it is at this period in time at which the magnetic recording is accomplished in a conventional manner of dynamically providing a digital signal in response to information at the standard read-write head mounted adjacent to the magnetic tape.

In order to reduce heat in the system and to improve the life of drive motors in the system, the tape drive system comprises a pair of intermittently operated reversible gear motors connected to the supply and take-up reels for the tape. A pair of pivoted tension arms is associated with the respective reels to sense the amount of slack in the tape on either side of the incremental tape advancing means. Limit switches which cooperate with the pivoted tension arms are adjusted to produce momentary energization of the respective motors when the tension arms reach a limit position. In this manner the tape is dispensed a number of increments at a time by momentary operation of the motor which, by means of a fly wheel effect in its gear train will drive past the limit and meter out a substantially constant amount of tape for each momentary actuation. Thus, the motors need not be energized continuously to thereby generate a considerable amount of heat, but are only operated a very small percentage of the time during the use of the tape recording system. This not only improves the efficiency in power requirements to the system, thereby making feasible battery operation if desired, but certainly also keeps down the amount of heat generated, removes the requirement for slip or friction clutches or complicated differential tape dispensing means, and assures that the life of the motors will not be a limiting factor in the useful maintenance free life of the digital recording equipment.

To further assure long life of the equipment and tapes and to prevent wear on the magnetic reading head, the tape is dispensed around the sprocket drum which has a significant diameter. The tension arms maintain the tape taut about this drum so that the magnetic pole piece can be mounted in a position close to the magnetic tape but not in contact therewith to preclude wear. The manner of operation is therefore similar to that found in connection with use of standard magnetic drums.

Further features and objects of the invention will be discussed hereinafter in more detail in connection with the accompanying drawing wherein.

Figure 1:
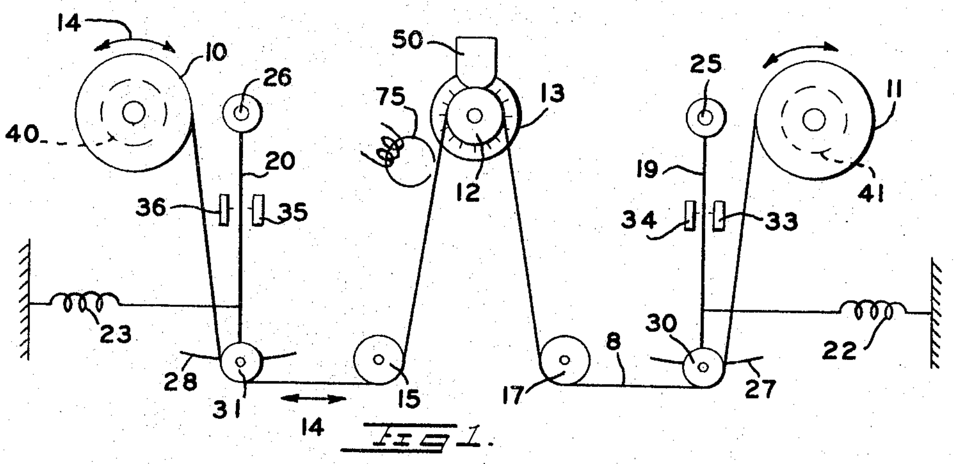
FIGURE 1 is a diagrammatic view of a tape drive system afforded in connection with the present invention.

Referring now to the tape transport system shown in FIGURE 1, a magnetic tape 8 having sprocket holes 9 (FIG. 2) therein is passed between a pair of storage reels 10 and 11 through an intermediate incremental tape advancing means comprising sprocket 12 and stepping motor 13. The stepping motor 13 is bidirectional in operation so that tape may be supplied from either reel 10 or reel 11 depending upon the direction of motion of the tape. This bidirectional motion is indicated by the arrows 14. The tape is passed about spindles 15 and 17 mounted on either side of the sprocket 12. These spindles hold the tape in such a position that it may pass over a pair of tension arms 19 and 20 which are biased by means of respective spring members 22 and 23 to maintain the tape 8 in a taut position over the sprocket drum 12 by action about the spindles 15 and 17. The tension arms are pivoted about the respective bearings 25 and 26 to move in arcuate paths 27 and 28 respectively.

At the extremity of the tension arm, a roller 30, 31 is attached to permit the tape to be reeled back and forth. These tension arms serve to thereby detect the amount of slack in the tape at either side of the intermittent drive means including sprocket 12. Thus, presume that the stepping motor is passing tape in a forward position between reel 10 and reel 11. Under these conditions, pivot arm 19 will move to the right in its arcuate path 27 as more tape is fed by the stepping motor 13. Similarly, the tension arm 20 will be moved to the right in its arcuate path 28 because of the tightening of the tape between the roller spindle 15 and the supply reel (in this case) 10. Such action occurs because of the braking action on the reels 10 and 11 produced by gear trains in motors 40 and 41. It is seen that if the tape is reversed in direction to pass from reel 11 onto reel 10 that the tension arms will work in a similar fashion except that in each case they will pass in the leftward direction within the respective slots 27 and 28.

Limit switches 33 through 36 are placed to sense the motion of the respective tension arms within their slots. This will permit the tension arm switches to control the feeding of tape upon reels 10 and 11 by energization of their respective drive motors 40 and 41. These drive motors are reversible motors wherein an internal gear train permits the reels to be mounted directly upon the motor shaft. This will give a fly wheel effect in operation of the motor so that if one of the limit switches is contacted briefly to permit a motor to be turned on momentarily, it will serve through action of the fly wheel effect of the gear train to gradually come to a halt and thereby pass a planned length of tape for each momentary impulse to the motor. In this way it may be seen that the motors 40 and 41 do not generate significant heat because of their intermittent operation and during the life of operation of a tape drive unit are actually in use only for a small percentage of the time. The motor construction may be chosen to permit the dispensing of length of tape desired for each energization period, which might be, for example, one inch. This of course, comprises a large number of increments of the stepping motor 13.

Figure 3:
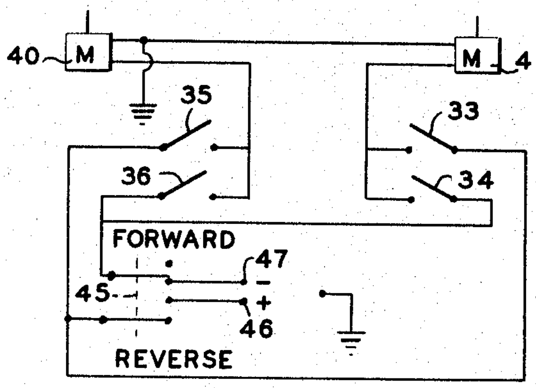
FIGURE 3 is a control diagram illustrating operation of the tape advancing means of the invention.

The manner in which the motors are controlled in terms of direction in accordance with one control circuit embodiment is shown in the diagram of FIG. 3. Here, a forward-reverse switch 45 is provided. Thus, if motors 41 and 40 are D.C. motors their drive direction may be reversed by changing the polarity of D.C. potential applied thereto. It may be seen that the moving of the gang switch 45 upwardly will provide a positive potential from terminal 46 to switches 33 and 35 which will control the motors 40 and 41 for operation of the tape in the forward direction. In this case, the switches 34 and 36 for controlling the motor in the reverse direction are taken out of circuit so that there is no danger of intermixing of the control signals. Similarly, when the switch 45 is put in a reverse condition as shown in the drawing, switches 34 and 36 are energized by a negative potential. This will tend to drive the tape in the direction of reel 10 from reel 11, and in the manner described the tension arms 19 and 20 will serve independently to adjust the length of tape in the loops between reel 11 and the sprocket 12 or between the sprocket 12 and reel 10 respectively.

Figure 2:
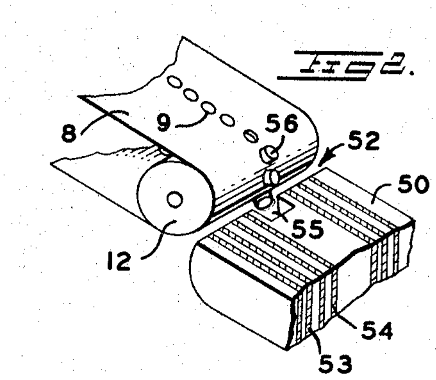
FIGURE 2 is a partial view of a tape drum drive and sectional view of the magnetic recording heads as used in accordance with the invention.

Returning to the view of FIG. 1, it is to be recognized that the stepping motor is a standard stepping motor of a multipolar construction which may be operated in either direction by some suitable arrangement. It may be coupled to the sprocket drum 12 either by a gear train or directly in order to provide a large number of steps between each sprocket tooth. Typical examples of operation are that the drum 12 is fashioned to have ten teeth spaced in one-tenth inch intervals around a one inch circumference. This large circumference on the reel permits the tape 8 to hug the reel closely as held in a downward position by the tension springs 22, 23 about the spindle rollers 15 and 17. This is pertinent as shown in the sketch of FIG. 2, since the magnetic head structure 50 is mounted slightly spaced from the magnetic tape 8 to provide the gap 52. This is done for the purpose of preventing wear on the tape, and in operation the magnetic heads will cooperate to write upon the tape in much the manner standard in the magnetic drum art. The head structure 50 may be a standard multi-channel head having separate heads 53, 54, etc. for the different recording tracks upon the tape 8. Thus, it is seen that the magnetic tape system is capable of multi-channel operation in the standard manner used in connection with the magnetic computer art of present day wherein a word comprising several bits is stored in parallel across the tape. Throughout the following operation, however, the description will be limited to writing upon a single channel in order to prevent complexity of this application from obscuring the nature of the invention. It is to be noted that a notch 55 may be placed within the head structure in order to accommodate the sprockets 56 and that the sprocket holes 9 may be placed in the tape whenever convenient so that they may appear substantially in the center of the tape as shown with the various tracks on either side thereof or if preferable, in order to simplify construction of the head assembly or in order to enable use of a standard head assembly, the sprockets and sprocket holes may be mounted on one or both sides of the head structure.

In operation, the stepping motor 13 may have the proper number of poles or, through connection with a gear train, may provide the proper number of steps in a motor having fewer poles. Typically, twenty recording steps are provided between each of the sprockets. This, with the dimensions given for the sprocket, will permit two-hundred recorded steps per inch of tape, which favorably compares with known digital tape recorders operating without the incremental step-to-step provision.

Stepping motors in practice have variations in positioning between one pole and the next dependent upon physical characteristics of the motor together with the electrical positioning of the poles. This may cause small variations in position from one recording to the other, and accordingly, it is desirable to maintain a complete motor revolution for each sprocket distance. This will prevent cumulative error from restricting operation to more coarse packing densities than those illustrated herein. As hereinafter disclosed, the manner in which the signals are written might otherwise tend to cause difficulty in registration of the signals appearing somewhere between the sprocket holes. However, if it is considered that the stepping motor makes a complete revolution in the twenty increments between each sprocket, there will be no difficulty in attaining the packing densities illustrated within very comfortable engineering tolerances and there need be no problem of registration or recall in any respect. Thus, it is noted that the even incremental number 20 of recorded bits between the sprocket positions precludes any requirement for the sprockets to be keyed to a particular registration position. That is, the stepping motor has the same relationship with any sprocket as had to the previous sprocket so that any vaiations from sprocket to sprocket, as would be introduced should the stepping motor for example have 19 steps per sprocket, will accordingly be eliminated. It is clear, therefore, that the present system provides an economical, simple and reliable tape transport with extremely few moving parts and which operates in such a manner that wear, life or registration problems are not presented to any significant degree.

Figure 4:
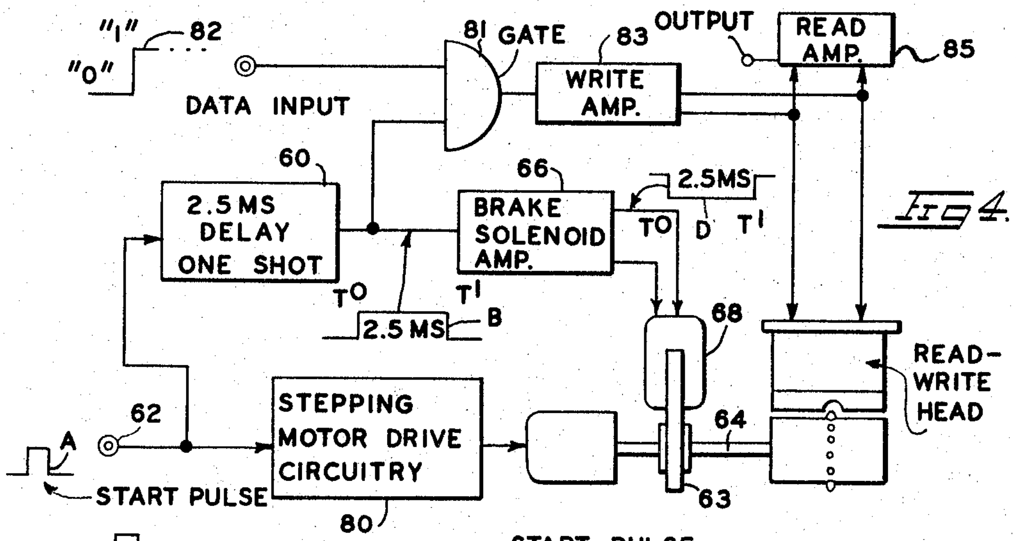
FIGURE 4 is a block circuit diagram of a recording system embodiment of the invention affording operation in accordance with presentation of digital signals from an external source.

Timing of the recording and playback signals is extremely simple, as shown in the system embodiment of FIGURE 4. Each step of the stepping motor requires approximately 5 milliseconds to complete the step, regardless of the stepping rate. The maximum acceleration of the step movement is reached in approximately 2.5 milliseconds; consequently, the one shot delay 60 is set for 2.5 milliseconds, to control each step responsive to a trigger pulse (A) at input terminal 62.

A stepping brake 63 is coupled to stepping motor shaft 64 to apply braking pressure at the midpoint of the step, or directly after the recording flux change has taken place at the end of 2.5 milliseconds. The brake solenoid is released at the initiation of the step cycle by operation of the brake solenoid amplifier 66 responsive to waveform (B), thus allowing the motor to accelerate and reach peak velocity without friction. Directly after peak velocity, at the end of the 2.5 millisecond period, the braking pressure is applied by operation of solenoid 68 which permits the motor to come to a damped stop, without overshoot or oscillation at the end of the stepping cycle. The damping can be easily controlled because the braking pressure is directly proportional to the solenoid drive which, in turn, can be easily controlled by electrical parameters.

Figures 5, 6:
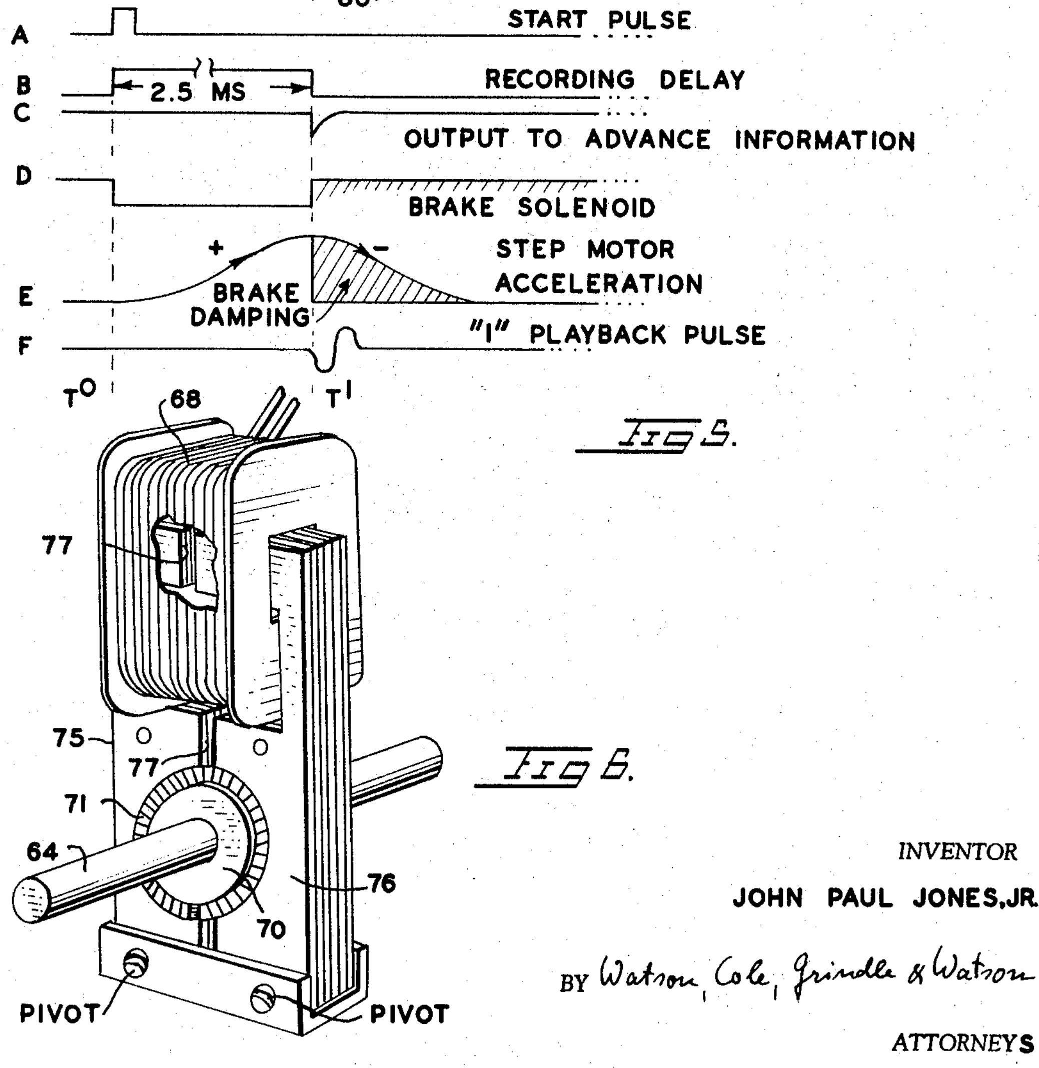
FIGURE 5 is a series of waveforms in timed relationship illustrating the nature of operation of the circuit embodiment of FIGURE 4.
FIGURE 6 is a perspective view of a magnetic braking unit used in accordance with the invention to attain incremental recording at high speeds.

With reference to the braking assembly detail as shown in FIGURE 6, notice that the brake disk 70 is surrounded by a split cylindrical ring or braking material 71 which has exactly the same inner radius as the outer radius of the brake disk 70. The fibre braking ring 71 is held by two semi-circular clamps 75 and 76, which also form a core for the solenoid coil 68. These brake clamps are symmetrical and identical, and are made from stamped laminations of solenoid core material. Two magnetized air gaps 77 act to give immediate leverage and pressure by pivoting the pair of core members 75 and 76 to squeeze the ring 71 about brake drum 70. There is essentially no distance to travel and consequently, little mass to move when the pressure is applied by the brake clamps. Consequently, response of the braking action is very fast, or approximately 100 microseconds.

Notice in FIGURE 4 that the 2.5 millisecond timing delay is used for both the control of the stepping brake solenoid and the positioning of the flux change at the peak acceleration point. As shown on the timing diagram of FIGURE 5, the start pulse (A) is the beginning of this timing cycle. It causes the stepping motor drive circuits 80 to step the motor 13 and triggers the 2.5 millisecond delay which strobes the information gate 81 to permit data signal 82 to pass to write amplifier 83 and, simultaneously, drives the brake solenoid amplifier 66. The output of the 2.5 millisecond delay is shown as waveform (B). Input information that is to be recorded, must be present at the time the step cycle is started and must last at least 2.5 milliseconds. Waveform (C) is the differentiated output of the end of the delay cycle, which can be used as an output, to advance new information to the input circuitry. Waveform (D) is the inverted and amplified drive that is taken from the 2.5 millisecond delay and is, in turn, used to drive the brake solenoid 68. Notice that when the 2.5 millisecond delay waveform (B) is present, the solenoid is de-energized. At all other times, the braking solenoid is normally energized or braking. The braking solenoid is released for exactly 2.5 milliseconds on each stepping cycle, regardless of whether a "one" or a "zero" level of information is fed into the input gate.

Waveform (E) shows the acceleration curve of the stepping motor, and the shaded area shows the period when the brake is applied to damp and decelerate the rotor motion. By applying this timed and incremental braking, much higher rates may be derived from any given stepping motor, since higher voltages and more current may be applied to the armature coils, resulting in higher acceleration rates, without the disadvantage of overshoot and oscillation at the end of the stepping cycle. Oscillation and overshoot are the normal limiting factors to the stepping rates of any given stepping motor; consequently, this incremental braking can be used to at least double the stepping rate of a given stepping motor, with no loss in power, or undesirable oscillation effect.

The playback cycle does not require any special timing, since the initial recording transient of the 2.5 millisecond pulse always occurs at the START point on the tape or where the acceleration curve is almost zero. Consequently, there is no $D\phi Dt$ or voltage generated in the pickup head at the start/stop points. Therefore, the only transients that are picked up would be the return to zero transient of the "one" recording pulse at the trailing edge of waveform (B). Information would, therefore, be picked up 2.5 milliseconds after the START pulse in the playback cycle for each step. This tape pickup head pulse is shown as waveform (F). This may be processed conventionally in read amplifier 85.

Accordingly, a simplified and improved incremental magnetic tape recording system is provided with features of novelty defined in the following claims:

1. An incremental magnetic tape recording system comprising in combination, means for advancing magnetic tape step by step in increments including a multiple stepping motor and sprocket drive member, wherein the stepping motor drives the tape at an accelerating velocity during a drive actuation interval and wherein the means for advancing provides driving energy pulses to the motor such that the motor drives the tape at a peak velocity substantially at the expiration of the energy pulse and thereafter decelerating to a rest position at the next stepping pole position, a dynamic magnetic pole piece fashioned to store magnetic impulse signals upon the tape at each incremental step position and to read back the stored signals, and means effectuating the pole piece with a dynamic signal for magnetizing the tape substantially concurrent in time with the peak velocity of the tape, whereby dynamic recording techniques are used in a step-by-step incremental magnetic recorder.

2. A system as defined in claim 1, wherein the sprocket drive member constitutes a cylinder of substantial diameter and the magnetic tape is held in taut contact about the sprocket cylinder, and mounting means for the pole piece to keep it in a position close to the magnetic tape but not in contact therewith.

3. A system as defined in claim 1, wherein the stepping motor has a number of pole positions constituting an even integer for each of the sprocket positions on the sprocket member.

4. A system as defined in claim 1, wherein means is provided for moving the tapes backward or forward by control of the stepping motor.

5. A system as defined in claim 4, wherein two tape reels are provided to receive respectively magnetic tapes passing the sprocket member in respective forward and reverse direction, and each reel has a reversible geared down drive motor coupled thereto.

6. A system as defined in claim 5, wherein a pair of pivoted tape tension arms is provided, the arms being positioned on opposite sides of the sprocket to become movable in an arcuate path about the pivot point responsive to the amount of slack in the magnetic tape appearing at the respective side of the sprocket, a pair of limit switches for each tension arm, and a feed control circuit comprising means selecting one of the limit switches of each arm for forward motion of the tape and the other switch of each arm for backward motion of the tape so that a corresponding motor is energized briefly whenever the tape slack exceeds a predetermined amount, whereby the gear train on the motor provides a flywheel effect to cause the corresponding reel to coast to a stop at a position such that the tape is fed a plurality of increments upon each momentary contact of a limit switch coupled in the feed control circuit, thus constituting static non-energized motor drive means for driving the tape in either direction.

7. A system as defined in claim 1, wherein braking means is coupled to the stepping motor and selectively operable means are provided for actuation of the braking means during the deceleration period of the stepping motor.

8. A system as defined in claim 7, wherein the braking means comprises a solenoid having a two-piece core member, a brake drum is provided, and the core is constructed to squeeze the brake drum upon energization of the solenoid.

9. A system as defined in claim 7, including electronic control circuitry comprising a triggering pulse source, a pulse generator for preparing a timed operation pulse responsive to said tiggering pulse, said selectively operable means are responsive to the operation pulse to actuate the braking means, the means effectuating the pole piece are energized during the operation pulse period and the stepping motor is driven responsive to the triggering pulses from said source.

References Cited by the Examiner

UNITED STATES PATENTS 2,702,101 2/1955 Dewhurst -------- 188—163 X
2,953,369 9/1960 Goldberg et al. --- 226—144 X BERNARD KONICK, *Primary Examiner.*

A. I. NEUSTADT, *Assistant Examiner.*